US011296517B2

(12) United States Patent
Meng et al.

(10) Patent No.: US 11,296,517 B2
(45) Date of Patent: Apr. 5, 2022

(54) BATTERY AND EXTERNAL COMPONENT

(71) Applicant: Swit Electronics Co., Ltd., Nanjing (CN)

(72) Inventors: Ke Meng, Naniing (CN); Ping Chen, Naniing (CN); Xiaohui Zhu, Naniing (CN)

(*) Notice: Subject to any disclaimer, the term of this patent is extended or adjusted under 35 U.S.C. 154(b) by 324 days.

(21) Appl. No.: 16/483,745

(22) PCT Filed: May 14, 2019

(86) PCT No.: PCT/CN2019/086742
§ 371 (c)(1),
(2) Date: Aug. 6, 2019

(87) PCT Pub. No.: WO2020/019830
PCT Pub. Date: Jan. 30, 2020

(65) Prior Publication Data
US 2021/0328442 A1 Oct. 21, 2021

(30) Foreign Application Priority Data
Jul. 25, 2018 (CN) .......................... 201810833113.8

(51) Int. Cl.
H02J 7/00 (2006.01)
H01M 50/244 (2021.01)
(Continued)

(52) U.S. Cl.
CPC ......... H02J 7/0024 (2013.01); H01M 10/425 (2013.01); H01M 10/4207 (2013.01);
(Continued)

(58) Field of Classification Search
CPC ...... H02J 7/0024; H02J 7/0014; H02J 7/0029; H01M 50/244; H01M 10/46; H01M 10/4207; H01M 10/425; H01M 2010/4271
(Continued)

(56) References Cited

U.S. PATENT DOCUMENTS 5,717,937 A * 2/1998 Fritz ................... H02J 7/00047
713/300
5,867,007 A * 2/1999 Kim .................... H01M 10/482
320/118
(Continued)

FOREIGN PATENT DOCUMENTS

CN 201728641 U * 2/2011 ............. Y02E 60/10
CN 102593907 A * 7/2012 .......... H02J 7/00047
(Continued)

Primary Examiner — M Baye Diao

(57) ABSTRACT

The present invention discloses a battery and an external component, which belong to the field of power supply technologies for a movie and television shooting apparatus. The battery of the present invention is used in cooperation with an external component, including at least two battery packs, a microcontroller, and a series-parallel switching circuit, and further including a connector in cooperation with the external component, the microcontroller controlling the series-parallel switching circuit according to a cooperation state of the connector and the external component, so that the battery packs are connected in series or in parallel. The present invention can be compatible with a high/low voltage camera and a high/low voltage charger automatically.

5 Claims, 7 Drawing Sheets

(51) Int. Cl.
*H01M 10/42* (2006.01)
*H01M 10/46* (2006.01)

(52) U.S. Cl.
CPC ......... *H01M 10/46* (2013.01); *H01M 50/244* (2021.01); *H02J 7/0014* (2013.01); *H02J 7/0029* (2013.01); *H01M 2010/4271* (2013.01)

(58) Field of Classification Search
USPC .......................................................... 320/117
See application file for complete search history.

(56) References Cited

U.S. PATENT DOCUMENTS

| | | | | |
|---|---|---|---|---|
| 6,462,511 | B1 * | 10/2002 | Kwok | B60L 58/18 320/141 |
| 6,586,909 | B1 * | 7/2003 | Trepka | H01M 10/46 320/108 |
| 7,064,521 | B2 * | 6/2006 | Stanesti | H02J 7/0069 320/149 |
| 8,164,305 | B2 * | 4/2012 | Zhang | H01M 10/42 320/118 |
| 8,884,582 | B2 * | 11/2014 | DeFrank | H01M 10/46 320/112 |
| 9,130,381 | B2 * | 9/2015 | Li | H02J 7/0029 |
| 10,014,683 | B2 * | 7/2018 | Ellenberger | H02J 1/00 |
| 10,707,686 | B2 * | 7/2020 | Hardy | H02J 7/0018 |
| 2008/0084182 | A1 * | 4/2008 | Oberlin | H01M 10/4207 320/116 |
| 2016/0219664 | A1 * | 7/2016 | Ellenberger | H02J 7/0021 |
| 2017/0054303 | A1 * | 2/2017 | Choi | H02J 7/00304 |

FOREIGN PATENT DOCUMENTS

| | | | | |
|---|---|---|---|---|
| CN | 202662636 U | | 1/2013 | |
| CN | 102969755 A | | 8/2013 | |
| CN | 203166556 U | | 8/2013 | |
| CN | 106712698 A | | 5/2017 | |
| JP | H0775257 A | * | 3/1995 | |
| JP | 5691981 B2 | * | 4/2015 | ............. B60L 58/19 |
| JP | 2018085283 A | * | 5/2018 | ............ Y02T 90/122 |
| KR | 20160138562 A | * | 12/2016 | ............ H02J 7/0016 |
| WO | WO-2011060531 A | * | 5/2011 | ............... B60K 6/28 |

* cited by examiner

BATTERY AND EXTERNAL COMPONENT

BACKGROUND

Technical Field

The present invention relates to the field of power supply technologies for a movie and television shooting apparatus, and in particular, to a battery and an external component.

Related Art

With the development of camera technologies, power consumption of a camera is increasingly larger. In order to improve working stability of the camera, an input voltage range of cameras of some brands is increased to 19.5 V-34 V. A voltage within this range is collectively referred to as a high voltage below, and such camera is hereinafter referred to as a high-voltage camera. An output voltage range of a battery of a conventional camera ranges only from 10.8 V to 16.8 V, a voltage within this range being collectively referred to as a low voltage below.

A camera using such battery to supply power is hereinafter referred to as a low-voltage camera, which cannot meet requirements for power of the high-voltage camera.

The high-voltage camera and the low-voltage camera have a same power input interface which is a V-shaped or Anton buckle plate. Therefore, a high-voltage battery structure may also be hung on the low-voltage camera, which causes damage to an apparatus. Although some manufacturers change locations of a positive electrode and a negative electrode of a battery and an electrode can be output only after the battery is connected to a respective buckle plate, there is still a risk that such high-voltage battery is hung on the low-voltage camera after being connected to the buckle plate, while increasing a total number of user apparatuses, which is not conducive to management. Similarly, placing a high-voltage battery in a low-voltage charger may also cause damage to a charger. In short, high-voltage batteries in the current market support only high-voltage charging and discharging, and cannot be compatible with the low-voltage camera and the low-voltage charger.

SUMMARY

The present invention is intended to provide a battery that can be automatically compatible with both a high-voltage battery and a low-voltage battery simultaneously.

In particular, the present invention provides a battery. The battery is used in cooperation with an external component, including: a microcontroller, a series-parallel switching circuit, and at least two battery packs; and further including a connector in cooperation with the external component, the microcontroller controlling the series-parallel switching circuit according to a cooperation state of the connector and the external component, so that the battery packs are connected in series or in parallel.

Further, the battery further includes a battery charging and discharging management chip for balancing voltages of battery cells of the battery packs during charging or discharging of batteries in series or in parallel.

Further, the battery charging and discharging management chip is disposed with a communication terminal and a voltage monitoring terminal, the communication terminal being connected to the microcontroller and the voltage monitoring terminal being connected to a positive electrode and a negative electrode of the battery pack respectively.

Further, the battery further includes an on/off protection circuit for providing on/off protection in case of an abnormal situation during charging and discharging.

Further, the battery packs include a first battery pack and a second battery pack.

Further, the series-parallel switching circuit includes a first switch, a second switch, and a third switch, two ends of the first switch being connected to positive electrodes of the first battery pack and the second battery pack respectively, and two ends of the third switch being connected to negative electrodes of the first battery pack and the second battery pack respectively. One end of the second switch is connected to a negative electrode of the first battery pack, and the other end of the second switch is connected to a positive electrode of the second battery pack. When the second switch is closed but the first switch and the third switch are disconnected, the first battery pack is connected in series with the second battery pack. When the second switch is disconnected but the first switch and the third switch are closed, the first battery pack is connected in parallel with the second battery pack.

Further, the on/off protection circuit includes an MOS1, an MOS2, an MOS3, and an MOS4.

A source of the MOS1 is connected to a positive electrode of the first battery pack, a drain is connected to the MOS2, and a gate is connected to the battery charging and discharging management chip. A source of the MOS2 is connected to a positive output electrode of the battery, and a gate is connected to the battery charging and discharging management chip. A source of the MOS3 is connected to the positive electrode of the second battery pack, a drain is connected to the MOS4, and a gate is connected to the battery charging and discharging management chip. A source of the MOS4 is connected to the first switch and the second switch, and a gate is connected to the battery charging and discharging management chip.

Further, the connector is connected to an external component in a contact manner or in a contactless manner for cooperation.

Further, the connector is a reed switch, and the external component is disposed with a magnet, the magnet being connected to the reed switch in a contactless manner.

Further, the connector is an electrode, and the external component is disposed with an external electrode, the external electrode being connected to the connector in a contact manner.

The present invention further provides an external component, which is used in cooperation with the battery in the foregoing technical solution, the external component being a battery buckle plate.

A beneficial effect of the present invention is as follows: only the battery buckle plate hung on the high-voltage charger or the high-voltage camera needs to be changed, so that the battery of the present invention can automatically match a charger or a camera with different voltages installed with a corresponding battery buckle plate, thereby being compatible with the high-voltage charger, a low-voltage charger, a low-voltage camera, and the high-voltage camera. There is no need to artificially determine whether a voltage type of the battery matches a voltage of the charger or the camera, thereby effectively avoiding a hidden danger caused by a human operation error. Due to full compatibility with the low-voltage charger, a user does not need to purchase the low-voltage charger, thereby reducing types of chargers purchased by the user. Due to full compatibility with the low-voltage camera, uses of the battery are increased and types of batteries purchased by the user are reduced.

Figure 1:
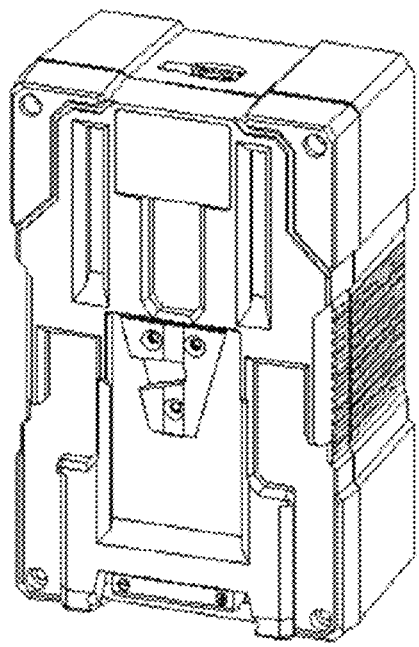
FIG. 1 is a schematic overall diagram of a battery according to Embodiment 1 of the present invention.

Reference numerals in the figure: 3—buckle plate, 301—magnet, 302—groove inside the buckle plate, 31—camera buckle plate, 32—charger buckle plate, 4—battery, 401—reed switch, 402—wire, 7—camera, 8—charger, 901—first electrode, 902—second electrode.

DETAILED DESCRIPTION

The present invention is further described in detail below in combination with the embodiments and with reference to accompanying drawings.

Embodiment 1

One embodiment of the present invention is a battery that can automatically switch between a high-voltage charging and discharging state and a low-voltage charging and discharging state.

The present invention combines two technical means of automatic identification and automatic control, so that the battery automatically can switch between a high-voltage charging and discharging state and a low-voltage charging and discharging state.

A voltage level of a camera or a charger can be automatically recognized in a way of contactless proximity sensing. That is, a pair of contactless connectors are installed on the battery and on buckle plates of a high-voltage camera and a high-voltage charger. When the battery is hung on such buckle plate, the camera or the charger is automatically recognized as a high-voltage apparatus, and a high-voltage circuit is turned on to implement high-voltage charging and discharging. The contactless connector is not installed on a buckle plate of a low-voltage camera or a low-voltage charger. When the battery is hung on the buckle plate, it is determined that the camera or the charger on which the buckle plate is located is a low-voltage apparatus, and a low-voltage circuit in the battery is turned on to implement low-voltage charging and discharging. Definitely, automatic identification can also be implemented by means of short-range wireless communication.

Automatic control is implemented using the following methods.

There are two sets of low-voltage battery packs inside the battery, the two sets of low-voltage battery packs being connected by a series-parallel switching circuit.

The series-parallel switching circuit is controlled by a microprocessor.

Through a combination of automatic identification and automatic control, the microprocessor controls the series-parallel switching circuit according to the foregoing result of automatic identification, finally implementing modes of high-voltage charging and discharging and low-voltage charging and discharging of the battery.

Figure 2:
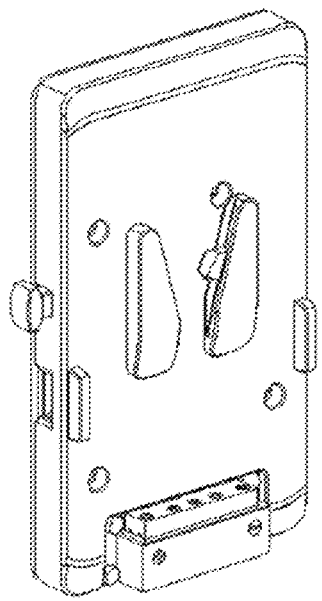
FIG. 2 is a schematic overall diagram of a buckle plate according to Embodiment 1 of the present invention.
Figure 3:
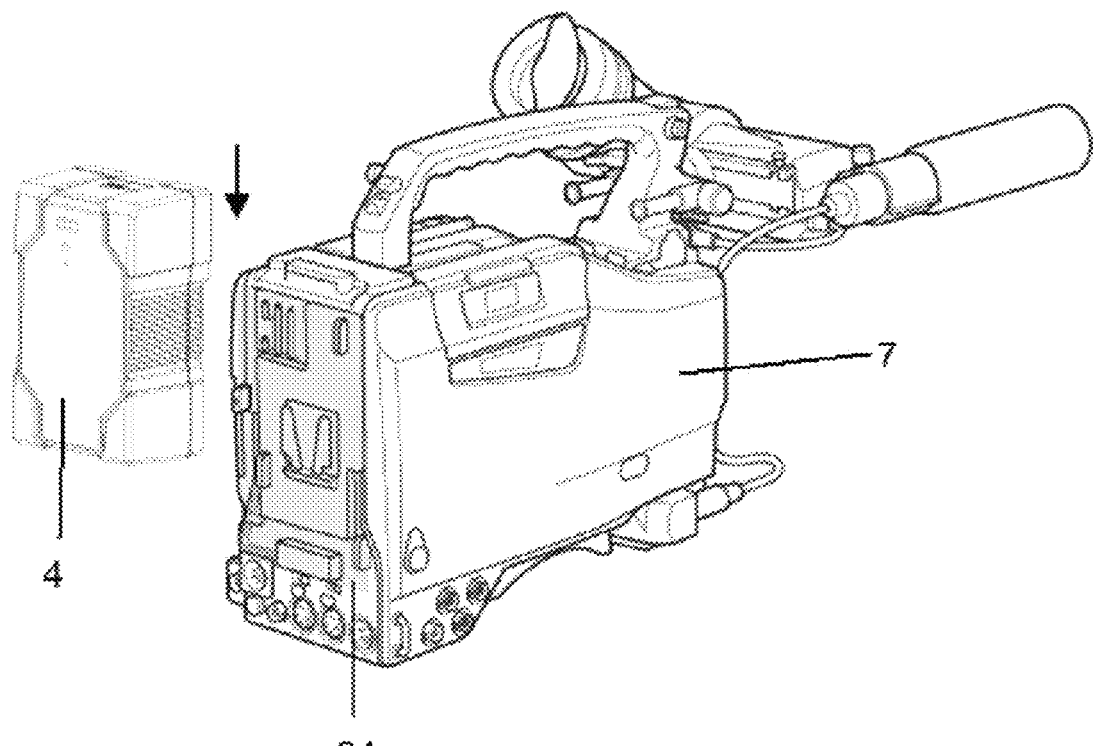
FIG. 3 is a schematic diagram of a battery hung on a camera according to Embodiment 1 of the present invention.
Figure 4:
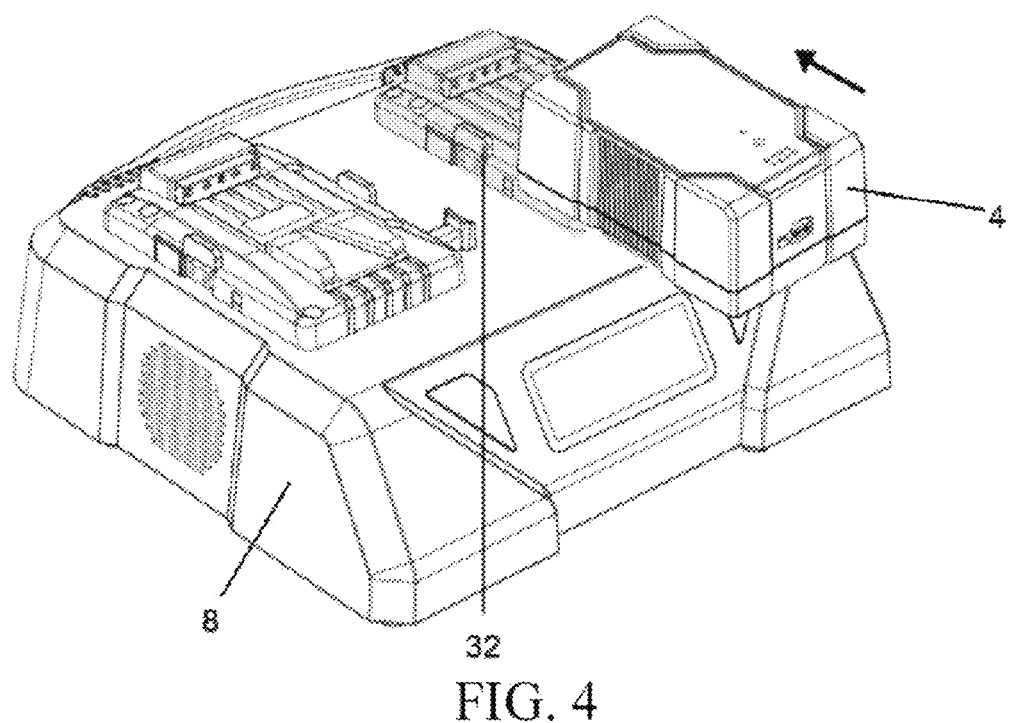
FIG. 4 is a schematic diagram of a battery hung on a charger according to Embodiment 1 of the present invention.
Figure 5:
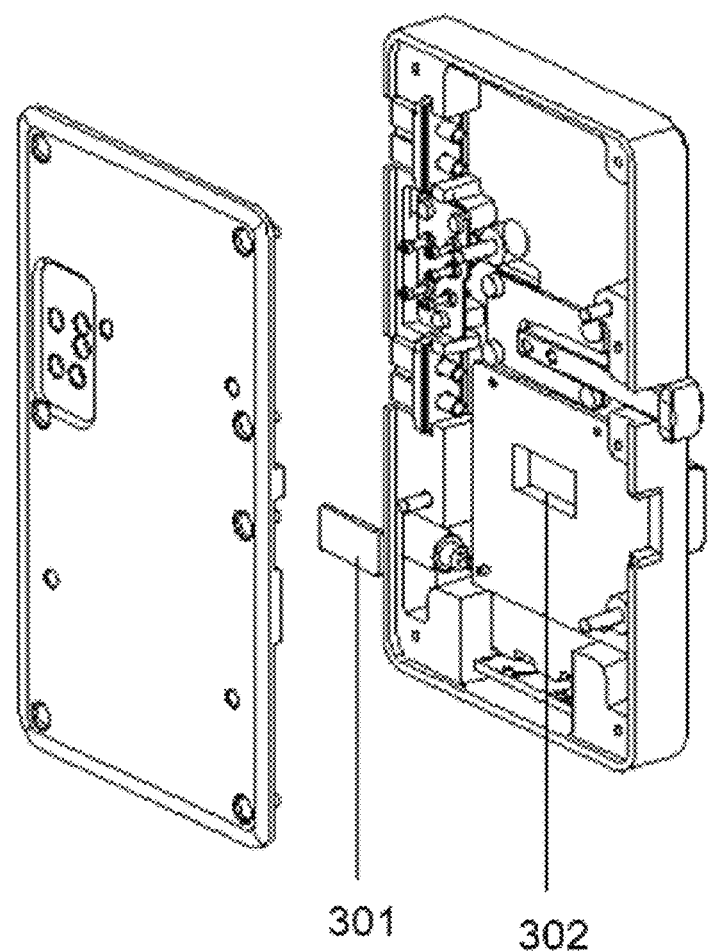
FIG. 5 is a schematic dismantling diagram of a buckle plate according to Embodiment 1 of the present invention.
Figure 6:
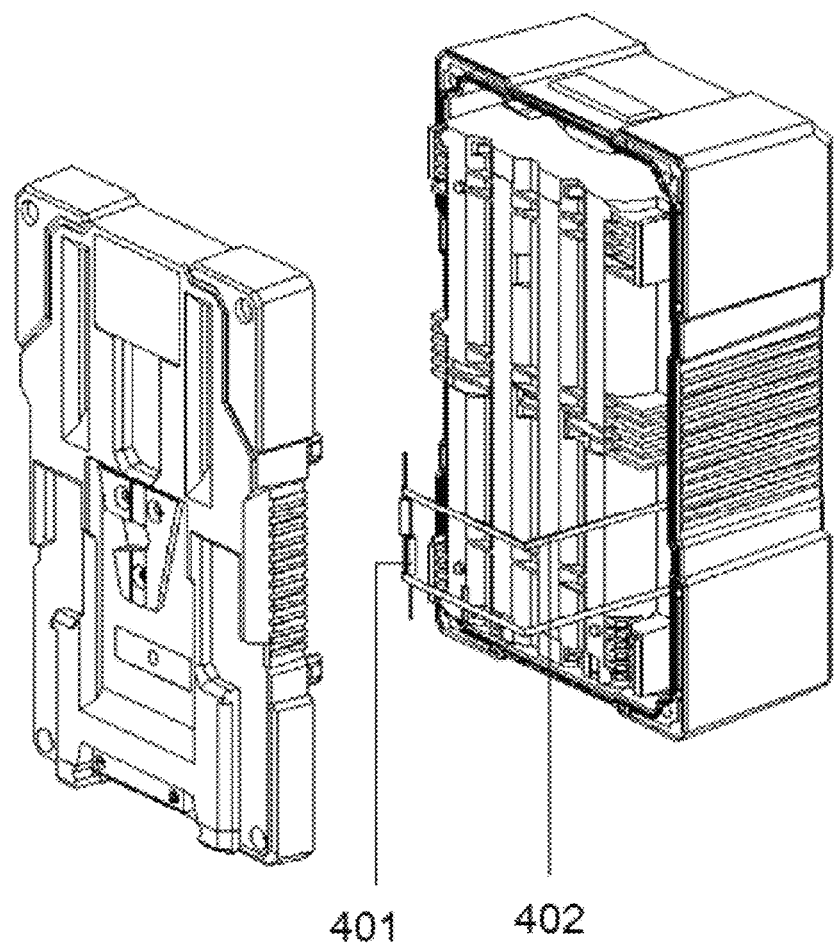
FIG. 6 is a schematic dismantling diagram of a battery according to Embodiment 1 of the present invention.
Figure 7:
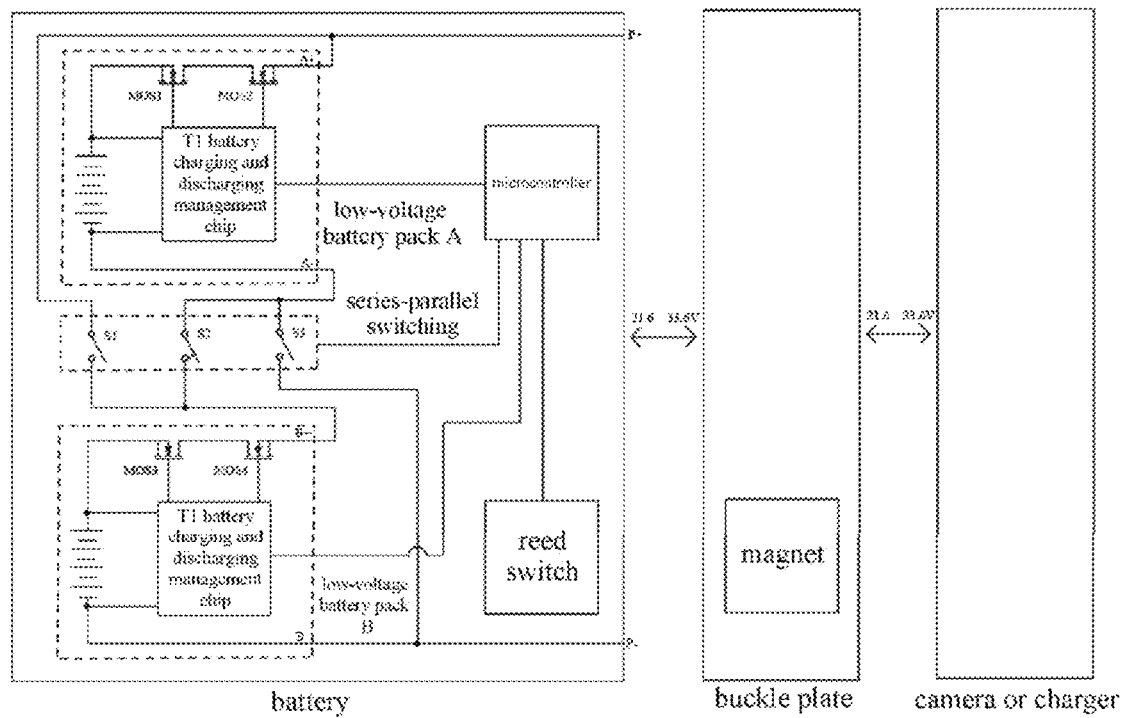
FIG. 7 is a block diagram of a system in a high-voltage state according to Embodiment 1 of the present invention.
Figure 8:
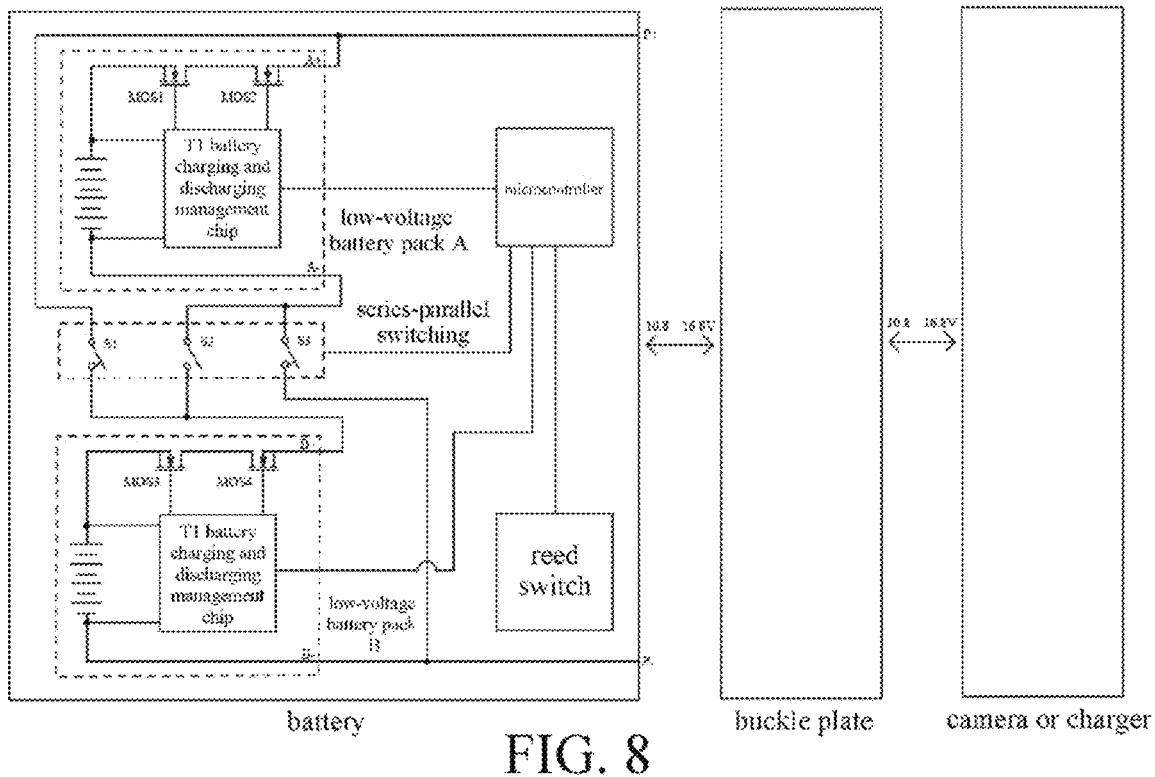
FIG. 8 is a block diagram of a system in a low-voltage state according to Embodiment 1 of the present invention.

A system of the present invention mainly includes two parts, one being a battery 4 and the other being a buckle plate 3, as shown in FIG. 1 and FIG. 2. As shown in FIG. 3 and FIG. 4, a buckle plate is fixed on a camera 7 or a charger 8, where a buckle plate fixed on the camera 7 is 31, a buckle plate fixed on the charger 8 is 32, and the battery 4 is hung on the buckle plate 31 or 32. As shown in FIG. 5, a magnet 301 may be placed in a groove 302 inside a buckle plate. As shown in FIG. 6, a reed switch 401 on a back of a battery is connected to a PCB inside a front face of the battery via a wire 402. The reed switch 401 and the magnet 301 inside a buckle plate are combined as a magnetic switch to control a series-parallel switching circuit in the battery. As shown in FIG. 7, the battery 4 contains low-voltage battery packs A, B, a microcontroller circuit, a series-parallel switching circuit, and the reed switch 401. The series-parallel switching circuit includes switches S1, S2 and S3. One end of S1 is connected to a positive electrode of a battery pack A through the MOS1 and the MOS2, and the other end is connected to a positive electrode of a battery pack B through the MOS3 and the MOS4. Two ends of S3 are connected to negative electrodes of the battery packs A and B respectively. One end of S2 is connected to a negative electrode of the battery pack A, and the other end is connected to the positive electrode of the battery pack B through the MOS3 and the MOS4. When the battery 4 is connected to the charger 8 or the camera 7 through a buckle plate on which the magnet 301 is placed, the reed switch 401 is closed under an action of the magnet, S2 is closed using a micro control circuit, and S1 and S3 are disconnected, so that the low-voltage battery packs A, B enter a high-voltage mode in series. At this time, the battery 4 can be adapted to a high-voltage charger or a high-voltage camera. As shown in FIG. 8, when the battery 4 is connected to the charger 8 or the camera 7 through a buckle plate (referred to as a normal non-magnetic buckle plate) on which the magnet 301 is not placed, the reed switch 401 is normally open, a microcontroller controls S2 to be disconnected, and S1 and S3 are closed, so that low-voltage battery packs A and B enter a low-voltage mode in parallel. At this time, the battery 4 can be adapted to a low-voltage charger or a low-voltage camera.

As shown in FIG. 7 and FIG. 8, a TI battery charging and discharging management chip balances a voltage of a battery cell of a battery pack during charging or discharging of batteries in series or in parallel, thereby avoiding battery cell imbalance effectively. A communication terminal of the battery charging and discharging management chip is connected to the microcontroller, and a voltage monitoring terminal is connected to a positive electrode and a negative electrode of the battery pack respectively.

An on/off protection circuit composed of an MOS1, an MOS2, an MOS3, and an MOS4 plays a part in on/off protection in case of an abnormal situation during the charging and discharging, to prolong battery life and ensure battery performance. Referring to FIG. 5 and FIG. 6, a source of the MOS1 is connected to a positive electrode of a first battery pack, a drain is connected to the MOS2, and a gate is connected to the battery charging and discharging management chip. A source of the MOS2 is connected to a positive output electrode of the battery, and a gate is connected to the battery charging and discharging management chip. A source of the MOS3 is connected to a positive electrode of the second battery pack, a drain is connected to the MOS4, and a gate is connected to the battery charging and discharging management chip. A source of the MOS4 is connected to a first switch and a second switch, and a gate is connected to the battery charging and discharging management chip.

In summary, when a battery is connected to a non-magnetic buckle plate, the battery is in a low-voltage mode. After the battery is connected to a magnet bucket plate, the battery is in a high-voltage mode.

Embodiment 2

One embodiment of the present invention is a battery that can automatically switch between a high-voltage charging and discharging state and a low-voltage charging and discharging state. A difference from Embodiment 1 is implementation of automatic identification.

In this embodiment, a contact connector is used to recognize a voltage level of a camera or a charger automatically. That is, a pair of contact connectors are installed on the battery and buckle plates of a high-voltage camera and a high-voltage charger. When the battery is hung on such buckle plate, the camera or the charger is automatically recognized as a high-voltage apparatus, and a high-voltage circuit is turned on to implement high-voltage charging and discharging. The device is not installed on a buckle plate of the low-voltage camera or charger. When the battery is hung on the buckle plate, it is determined that the camera or charger is a low-voltage apparatus, and a low-voltage circuit is turned on to implement low-voltage charging and discharging.

Figure 9:
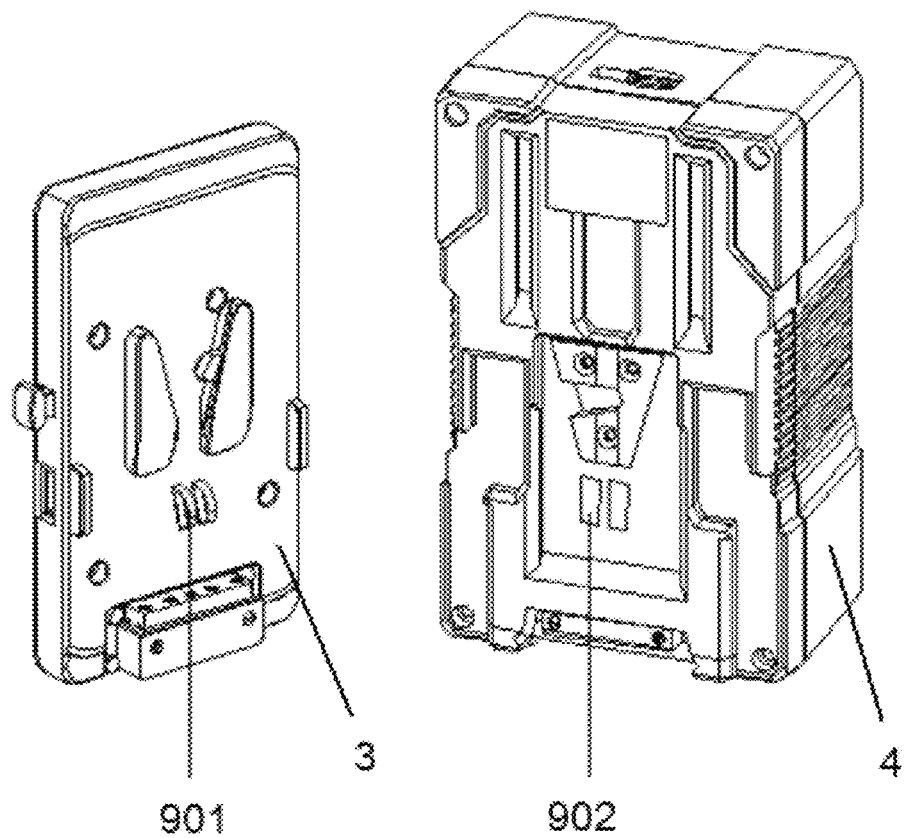
FIG. 9 is a schematic diagram of a battery and a buckle plate connected in a contact manner according to Embodiment 2 of the present invention.
Figure 10:
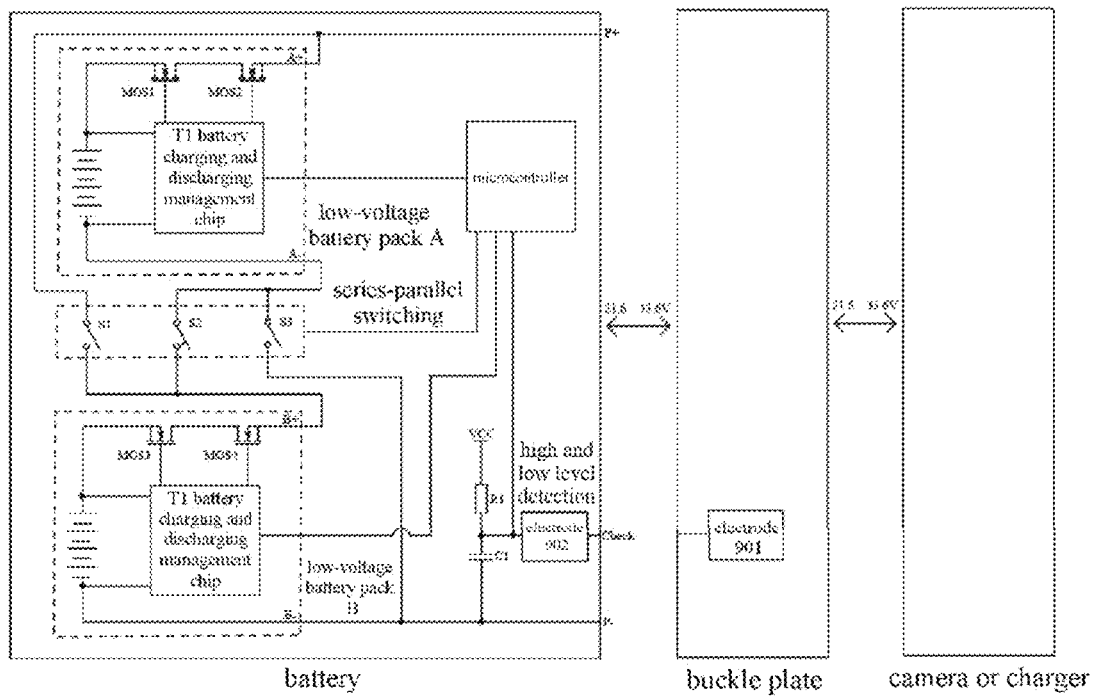
FIG. 10 is a block diagram of a system in a high-voltage state according to Embodiment 2 of the present invention.
Figure 11:
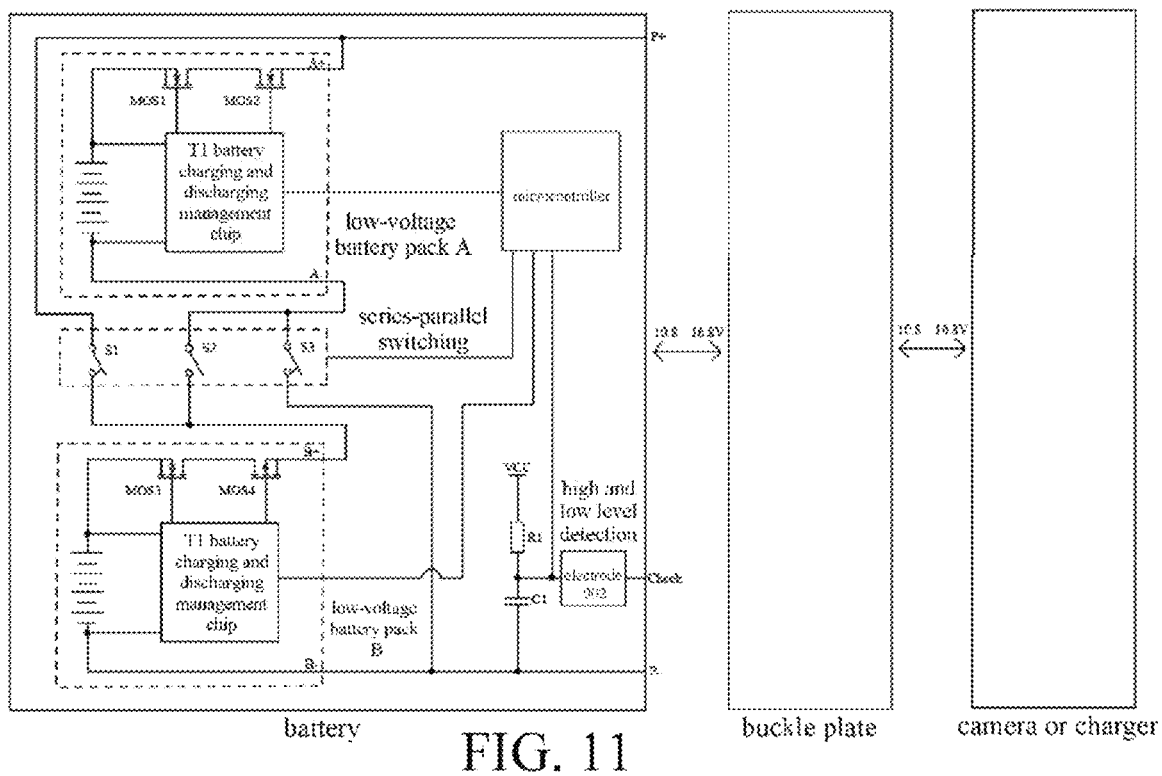
FIG. 11 is a block diagram of a system in a low-voltage state according to Embodiment 2 of the present invention.

As shown in FIG. 9, this embodiment includes two parts including a buckle plate 3 and a battery 4. The buckle plate 3 contains an electrode 901, a respective position of a back of the battery 4 contains an electrode 902, and the two electrodes are short-circuited. As shown in FIG. 10, the battery 4 contains low-voltage battery packs A, B, a microcontroller circuit, a series-parallel switching circuit, and an electrode 902. One end of the electrode 902 may be connected to an electrode 901 on a buckle plate, and the other end is connected to a resistor R1 and a capacitor C1. A positive power supply voltage VCC is grounded after passing through the resistor R1 and the capacitor C1 connected in series to form a high-low level detection circuit. When the battery 4 is connected to the charger 8 or the camera 7 through a buckle plate 3 with the electrode 901, the electrode 901 and the electrode 902 are in contact with each other. The microprocessor controls S2 to be closed according to a voltage signal of the high and low level detection circuit, and S1 and S3 are disconnected, so that the low-voltage battery packs A, B enter a high-voltage mode in series. At this time, the battery 4 can be adapted to a high-voltage charger or a high-voltage camera. As shown in FIG. 11, a battery 4 is connected to the charger 8 or the camera 7 through a bucket plate (referred to as a normal electrodeless buckle plate) without an electrode. The microcontroller controls S2 to be disconnected according to the voltage signal of the high and low level detecting circuit, and S1 and S3 are closed, so that low-voltage battery packs A, B enter a low-voltage mode in parallel. At this time, the battery can be adapted to a low-voltage charger or a low-voltage camera.

Although the present invention has been disclosed above in preferred embodiments, the embodiments are not intended to limit the present invention. Any equivalent changes or modifications made without departing from a spirit and scope of the present invention are also within protection scope of the present invention. Therefore, the protection scope of the present invention shall be subject to contents defined in claims of the present application.

What is claimed is:

1. A battery, the battery being used in cooperation with an external component, the battery comprising a microcontroller, a series-parallel switching circuit, and at least a first battery pack and a second battery pack, further comprising a connector in cooperation with the external component, the microcontroller controlling the series-parallel switching circuit according to a connection status of the connector and the external component, so that the battery packs are connected in series or in parallel, further comprising;
   a battery charging and discharging management chip, configured to balance a voltage of a battery cell of the battery packs during charging or discharging of batteries in series or in parallel;
   an on/off protection circuit, configured to perform on/off protection in case of an abnormal situation during charging and discharging;
   wherein the series-parallel switching circuit comprises a first switch, a second switch, and a third switch, two ends of the first switch being connected to positive electrodes of the first battery pack and the second battery pack respectively, two ends of the third switch being connected to negative electrodes of the first battery pack and the second battery pack respectively, and one end of the second switch being connected to a negative electrode of the first battery pack; and
   wherein the other end of the second switch being connected to a positive electrode of the second battery pack, wherein when the second switch is closed but the first switch and the third switch are disconnected, the first battery pack and the second battery pack are connected in series; and when the second switch is disconnected but the first switch and the third switch are closed, the first battery pack and the second battery pack are connected in parallel; and
   wherein the on/off protection circuit comprises an MOS1, an MOS2, an MOS3, and an MOS4, a source of the MOS1 being connected to a positive electrode of a first battery pack, a drain being connected to the MOS2, and a gate beinq connected to the battery charging and discharging management chip; a source of the MOS2 being connected to a positive output electrode of the battery, and a gate beinq connected to the battery charging and discharging management chip; a source of the MOS3 being connected to a positive electrode of the second battery pack, a drain being connected to the MOS4, and a gate being connected to the battery charging and discharging management chip; a source of the MOS4 being connected to a first switch and a second switch, and a gate being connected to the batter charging and discharging management chip.

2. The battery according to claim 1, wherein the connector is connected to an external component in a contact manner or in a contactless manner.

3. The battery according to claim 1, wherein the connector is a reed switch, and the external component is disposed with a magnet, the magnet being connected to the reed switch in a contactless manner.

4. The battery according to claim 1, wherein the connector is an electrode, and the external component is disposed with an external electrode, the external electrode being connected to the connector in a contact manner.

5. An external component for use in cooperation with the battery in claim 1, the external component being a battery bucket plate.

* * * * *